United States Patent Office.

PHILIP THORPE, OF NEW YORK, N. Y.

PREPARED FLOUR.

SPECIFICATION forming part of Letters Patent No. 269,743, dated December 26, 1882.

Application filed June 28, 1882. (Specimens.)

*To all whom it may concern:*

Be it known that I, PHILIP THORPE, of the city, county, and State of New York, have invented a new and Improved Prepared Flour, of which the following is a full, clear, and exact description.

The object of my invention is to manufacture a new and improved prepared flour, which needs only to be mixed with water to form a dough for biscuit; and the invention consists in thoroughly incorporating butter deprived of its water with flour and baking-powder mixed together in the proper proportions, so as to form a merchantable prepared flour of great fineness, adapted to keep for a long period, and requiring only the addition of water to form a dough.

In carrying out my invention pieces of pure creamery-butter are introduced into the flour and baking-powder mixed together in the proper proportions, and the mixed flour, baking-powder, and butter are pressed and rubbed together between rollers, and the process repeated until the flour, baking-powder, and butter are thoroughly incorporated. By continually pressing and rubbing the butter with the mixed flour and baking-powder the particles of the mixture finally will be no larger than the particles of ordinary flour, and each particle will consist of flour, butter, and baking-powder thoroughly mixed. The prepared flour thus formed has about the same appearance as ordinary flour, with the exception that it is of a slightly-yellowish appearance or color. The flour and baking-powder I employ are so fine and the butter so subdivided in the process of working them together that after the mixture the particles of intermixed flour, baking-powder, and butter can be sifted through an ordinary flour-sieve, as employed by housewives in making bread, which has never before been accomplished. The flour, baking-powder, and butter can be mixed in any apparatus that will press and rub the butter, flour, and baking-powder together, but preferably rollers will be used, between which the butter, flour, and baking-powder pass, and will thus be thoroughly incorporated, and the prepared flour has the desired fineness.

The prepared flour is packed in suitable vessels or packages, and, having no water in its composition, will keep for a long period.

To make a dough for biscuit, this prepared flour needs only to be mixed with water, when it will be ready for baking. Before mixing the butter with the flour and baking-powder it must be thoroughly worked to remove all water from it, as said water would cause the baking-powder to effervesce and injure the prepared flour.

I am aware that a prepared flour has heretofore been manufactured which requires only the addition of water to form a bread-making dough, and I therefore lay no claim, broadly, to such invention, in which the prepared flour used differs very materially from that employed by me.

I am also aware that a mixture of flour, fat, baking-powder, and water has heretofore been employed by housewives in the process of making bread, and I therefore lay no claim to such compound, in which the particles of flour and baking-powder are not thoroughly and uniformly impregnated with the fat, as in my invention. The particles of the prepared flour are coarse and incapable of passing through an ordinary flour-sieve, and the water in the compound or mixture causes the baking-powder to effervesce and the product to spoil in a short time, and will not furnish a prepared flour like mine, which is a merchantable product adapted to keep for a long time, and requiring merely the addition of water to form a dough.

Having thus fully described my invention, what I claim as new, and desire to secure by Letters Patent, is—

The improved prepared flour herein described, consisting of a mixture of flour, butter deprived of its water, as described, and baking-powder, in which mixture all the particles are intimately and evenly mixed, blended, or incorporated, whereby each particle of the compound is capable of being sifted through an ordinary bread-making sieve, as set forth.

PHILIP THORPE.

Witnesses:
OSCAR F. GUNZ,
C. SEDGWICK.